May 5, 1953 F. H. HOGE ET AL 2,637,526
CAR PULLER
Filed Jan. 30, 1950 8 Sheets-Sheet 1

Inventors:
Frederick H. Hoge &
Joseph A. Marland,
by Thos. R. Lanning
Atty

May 5, 1953 F. H. HOGE ET AL 2,637,526
CAR PULLER
Filed Jan. 30, 1950 8 Sheets-Sheet 3

Inventors:
Frederick H. Hoge &
Joseph A. Marland,

May 5, 1953  F. H. HOGE ET AL  2,637,526
CAR PULLER
Filed Jan. 30, 1950  8 Sheets-Sheet 4
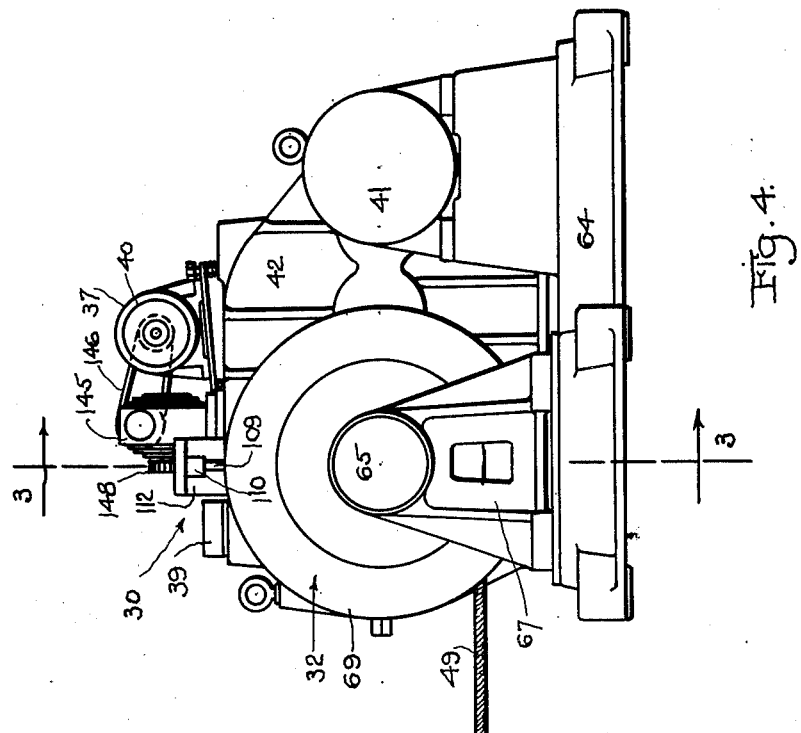
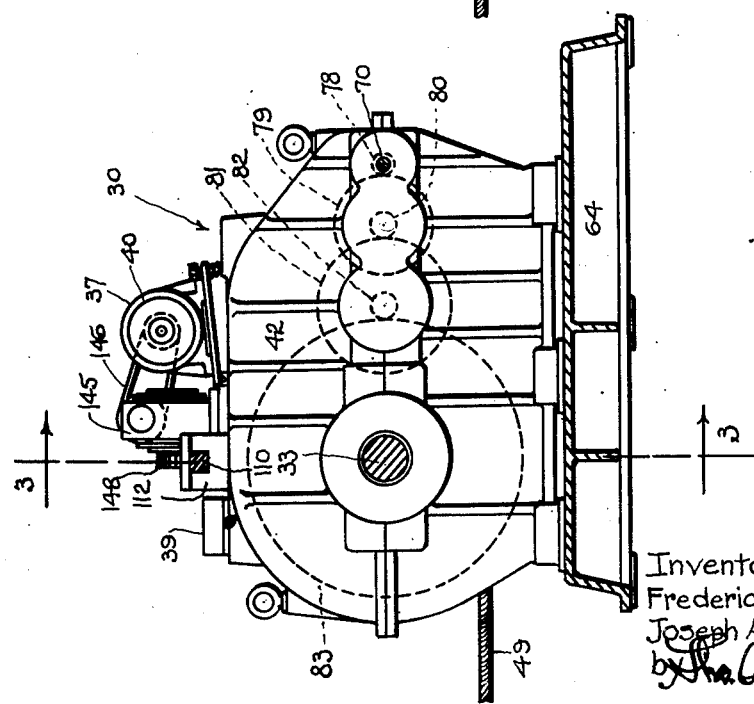
Inventors:
Frederick H. Hoge &
Joseph A. Marland

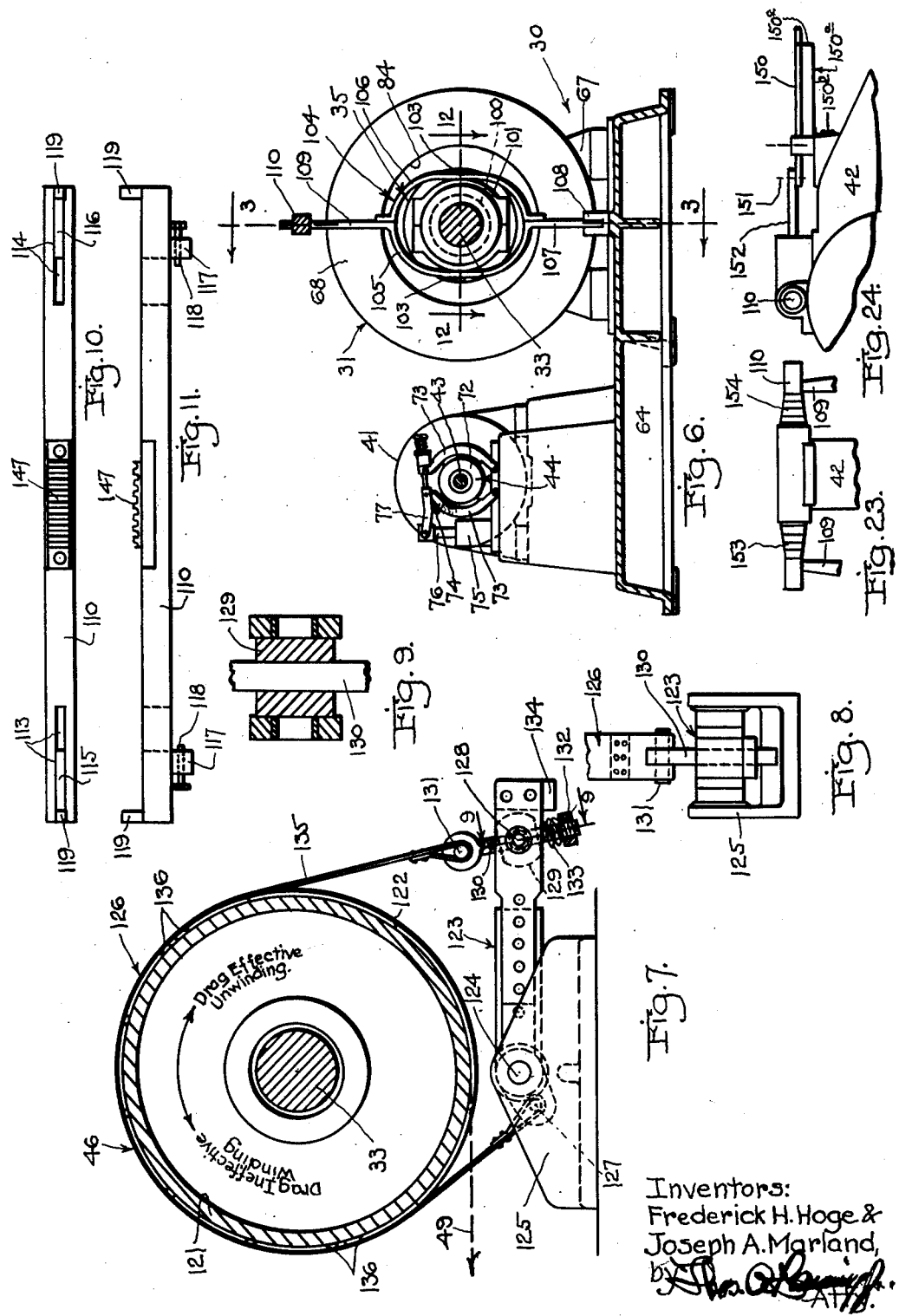

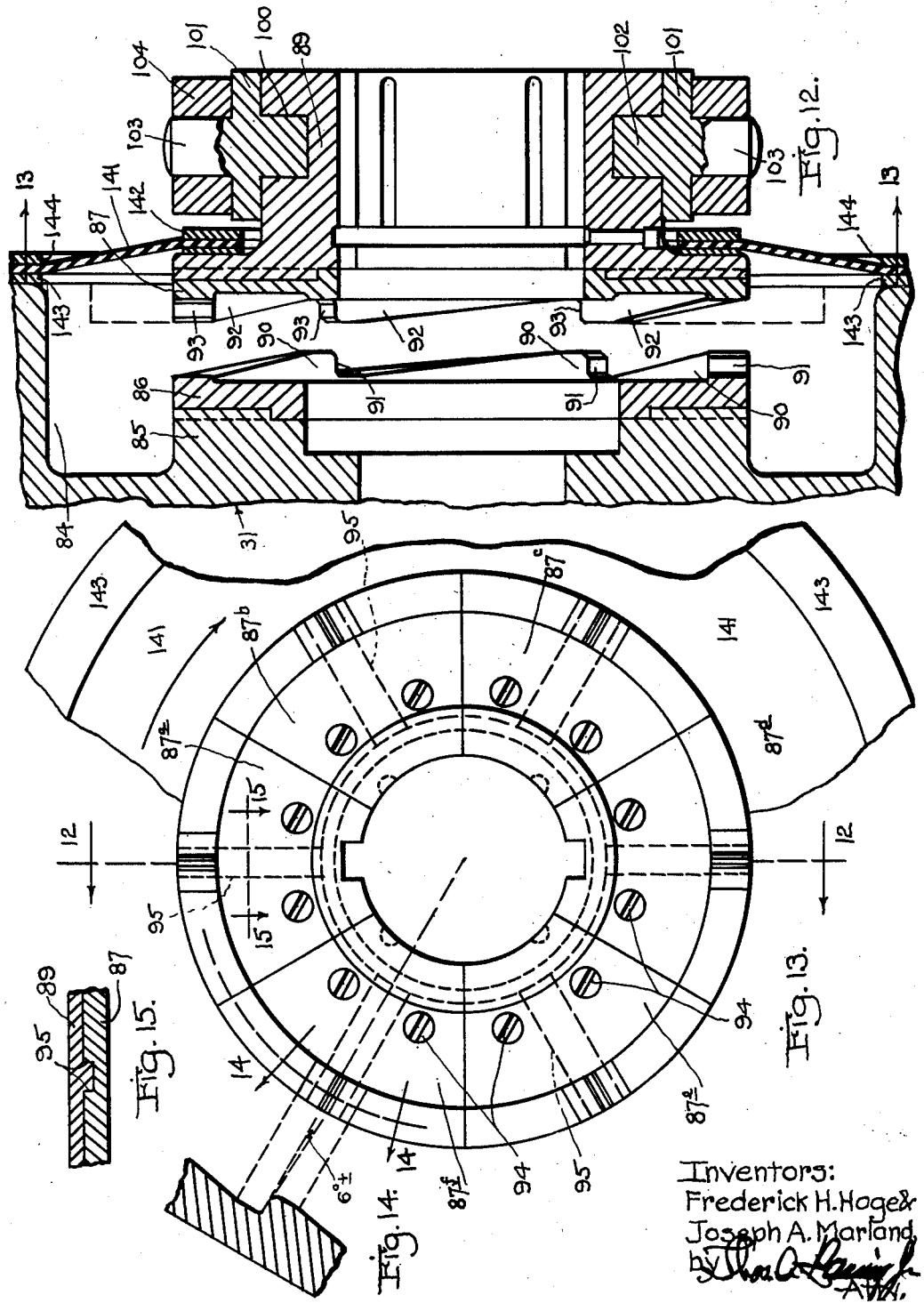

May 5, 1953 F. H. HOGE ET AL 2,637,526
CAR PULLER
Filed Jan. 30, 1950 8 Sheets-Sheet 7
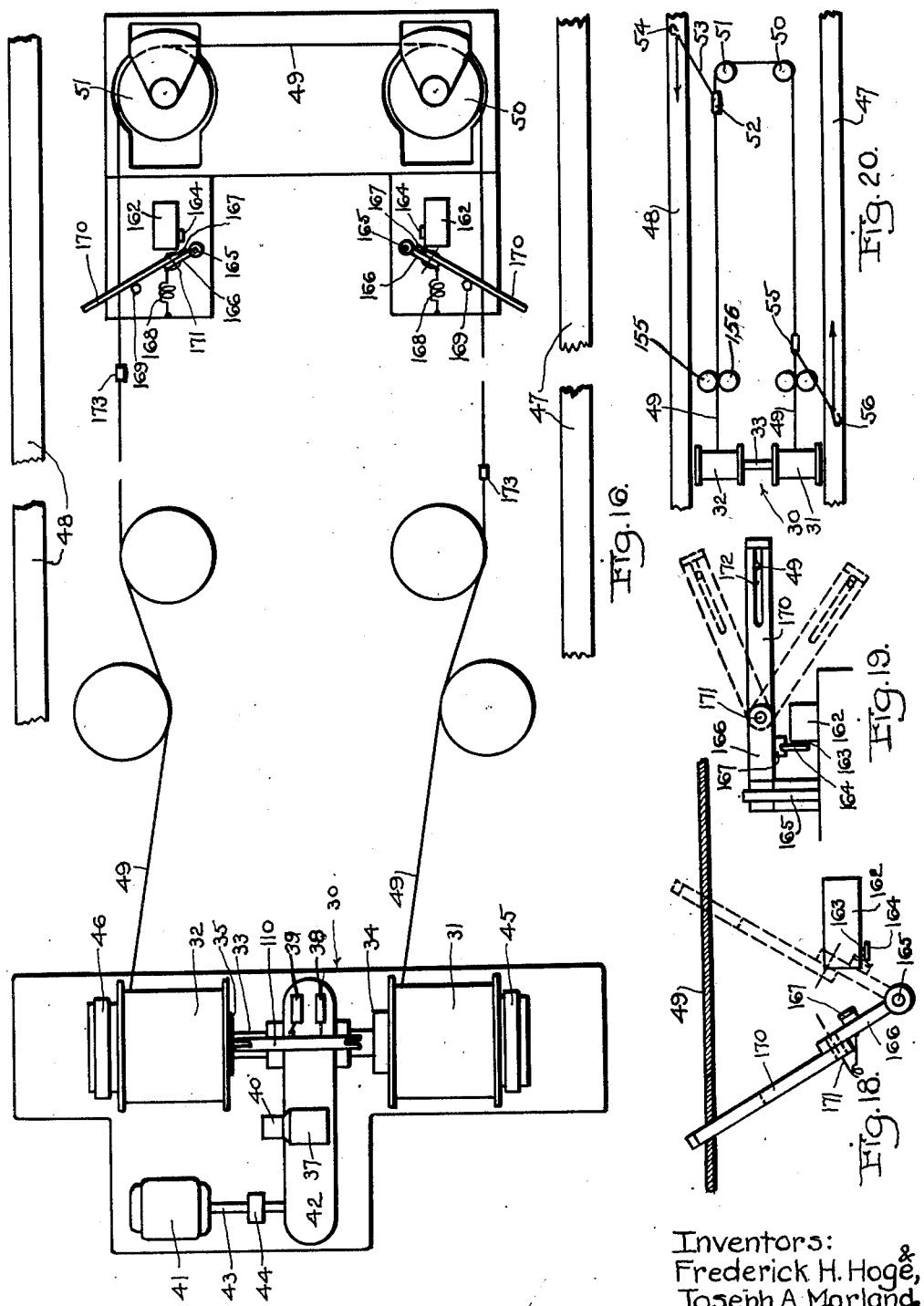
Inventors:
Frederick H. Hoge &
Joseph A. Marland
by Jno. A. Lamagh
Atty.

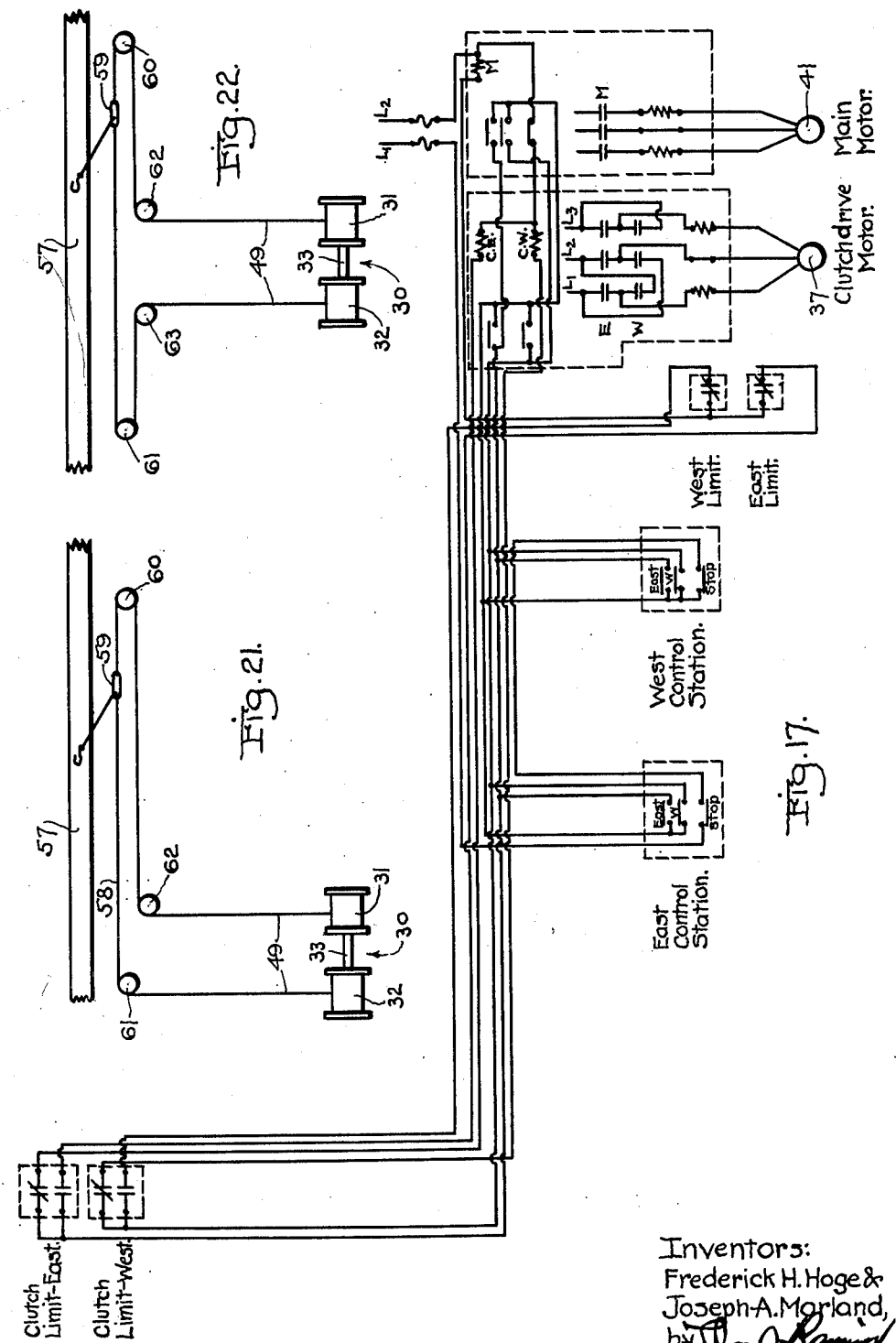

Patented May 5, 1953

2,637,526

UNITED STATES PATENT OFFICE 2,637,526

CAR PULLER

Frederick H. Hoge, Oak Park, and Joseph A. Marland, La Grange, Ill., assignors to W. A. Jones Foundry & Machine Company, Chicago, Ill., a corporation of Illinois Application January 30, 1950, Serial No. 141,312

3 Claims. (Cl. 254—185)

The present invention relates to improvements in car pullers, and the like. It will presently appear that machines embodying the features of the present invention may also be used for various purposes other than car pulling; but generally the present improvements have been devised to meet the special conditions of operation imposed in car pulling operations. Specifically, also, the present features relate to two way car pullers, that is, car pullers which are intended for pulling the cars in either direction as desired. The following statement of certain operations will clarify certain of the operational functions for which the present machines are intended.

In various industrial operations it is necessary to advance a string of cars with intermittent advancements during loading and unloading operations. Usually such advancements are made one car-length at a time, but other amounts of advancement may also be desired. For example, in the loading of a string of tank cars it is frequently necessary to bring each car in the string into loading position with respect to a liquid delivery pipe or spout so that the cars may be successively filled with such liquid. This is true, for example, in tank car oil loading operations. Similar intermittent advancements of a string of cars may be necessary during subsequent unloading operations. In each case, however, the extent of advancement of the string of cars must be under such control that each car may in turn be brought to correct position with respect to the loading or unloading platform or wharf.

It is necessary to provide power means for moving the string of cars, and such power means must be under such control that it may be started and stopped, and locked in stopped position in order to hold the string stationary during the process of loading or unloading each car, and with such car retained in correct position for such loading or unloading operation. This means that the control of the string movements must be such that the operator may start and stop the power unit at will and with close accuracy so as to bring each car into correct position, regardless of the lengths of the various cars comprising the string, and regardless of the exact position along the length of each car at which the load is to be delivered to or removed from the car in question. In order to hold the string of cars stationary in the position to which the string has been moved it is necessary to provide braking means in the car puller for this purpose.

It is a prime object of our present invention to provide a stationary car puller unit which incorporates power means to move the string of cars in either direction as desired by the operator, means to normally lock said power means against car pulling movement until the operator moves the control element to position for car pulling in selected direction, and control means to effect such car movement in either direction with proper release of the brake means during the moving operation and re-setting of said brake means when the control element is moved to position for discontinuance of car pulling movement.

More specifically, it is a further object of the invention to provide a car puller unit which may be located at a convenient location with respect to the track along which the car string is to be moved, together with means to readily connect said car puller unit to the string of cars for transmission of the necesary pulling forces. In this connection it is a further object to so arrange this connecting means that the same may be readily attached to the car string for movement in either direction as selected.

Specifically, the connecting means includes a loop of cable having one side or pass of its loop extending parallel to the track along which the car string is to be moved, together with simple means to connect one point of the cable to the car string so that cable movement will draw the car string along the track. The ends of said cable loop are connected to the car puller power drive in such manner that one end or the other of the cable may be power pulled to thereby move the loop of cable around its looping supports thus carrying said connection of the cable to the car string along the loop parallel to the track and correspondingly moving the car string as desired.

Still more specifically, the car puller unit includes two cable drums to which the ends of the cable are connected, together with power drive means, and means to selectively connect said power drive means to either drum for drive of such drum, with corresponding pull exerted on the corresponding end of the cable loop, for cable movement in the proper direction. In this connection, it is a further object to so arrange the car puller elements that the power drive means rotates in the same direction when driving either drum, thereby enabling the power drive means to be of the uni-directional type. When either drum is being driven the other drum is free from connection to the power drive means, and the winding of cable on the driven drum draws cable around the loop with corresponding unwinding of cable from the non-power driven drum, which non-power driven drum is rotated reversely during the winding of cable on the power-driven drum.

The cable loop is defined by suitably located pulleys over which the cable passes. In order to avoid fouling of the cable passing over these pulleys, and also to ensure good running of the cable in either direction it is desirable to maintain the cable reasonably taut at all times and for movement in either direction around the cable loop. Since drive from the power-drive means is necessarily only to a single drum at a time, the non-driven drum turning free in the opposite direction for release of cable drawn onto the cable loop, it follows that in the absence of restraining means for said non-power-driven drum said drum may rotate unrestrainedly with release of cable at too fast a rate so that the cable of that portion of the loop between the power-driven drum and the point of car string attachment will be taut due to the pulling effect of the power-driven drum, but the cable length between the point of car string attachment and the non-driven drum may become too loose with possible fouling of such portion of the cable, and other objectionable results.

It is therefore a further object of the present invention to provide drum drag or brake means for each drum of the car puller which drag or brake means will effect a sufficient dragging effect on such drum during unwinding rotation of such drum to maintain the cable sufficiently taut to ensure good running of the apparatus. It is a further object of the invention to so form such drag or brake means that it will be practically ineffective to exert any dragging or braking effect during the winding rotation of such drum. It is a further object of the invention to so construct such drag means for each drum that the dragging or non-dragging effect of such drag means will occur automatically and without the need of provision of special connections to the other elements of the car puller or to the control means whereby the car puller is controlled. Such drag means for each drum is so arranged that it is substantially ineffective during drum rotation in the winding direction, and is effective for dragging purposes during drum unwinding operation. By so arranging the drag means that it is substantially ineffective during drum winding operation it does not impose any material increase on the torque which must be delivered to the drum during winding rotation by power drive.

A further feature of the invention relates to the provision of a common shaft on which both of the drums are journaled, power-drive means, means to drive said shaft by use of said power-drive means, and means to clutch said shaft to either drum as selected by the operator. Means are provided for effecting clutch connection to either drum selectively, according to the direction in which the cable is to be moved, and means to disconnect the other, previously engaged clutch means from its drum during the clutching operation of the first mentioned clutch means to its drum. We have provided positive clutching elements or faces in these clutches to ensure positive drum drive in the selected direction. The torque forces to be transmitted are sometimes very large, as when moving a train of more than a few cars, and consequently the driving forces to be exerted against such clutch faces are correspondingly large. We have found that under these onerous conditions of operation there is a strong holding force developed between the engaged faces of the clutch such force being sustained even when the driving force exerted through the clutch is released. It is necessary to disengage the loaded clutch faces from each other before bringing about clutch engagement of the other clutch with its drum.

It is also a further feature of the present invention that we have provided positive braking means to restrain the drum shaft against rotary movement when said shaft is not being power-driven. When one drum is being driven by said shaft, its clutch being correspondingly engaged for such drive, said engaged clutch transmits sufficient torque to drive said drum, according to the resisting force required to move the cable loop and the string of cars attached thereto. When such driving operation is discontinued, the car string having been brought to a selected position, the above mentioned braking means is made effective to lock the shaft against rotation, the clutching means to such driven drum remaining in engagement. By this arrangement the braking effect of such brake means serves to hold the cable loop against reverse movement, such as might be caused by a grade on which the car string is carried; but generally it will also be found that when said braking means is made effective the cable being drawn onto the drum will be under high tension, so that upon setting such brake means the clutch faces will remain under heavy force engagement.

Due to the large forces transmitted through the clutch faces, and both of the conditions explained above, it has been found that in the absence of special provision it is necessary to exert large forces in the axial direction of the shaft in order to disengage the previously engaged clutch. We have therefore, as an important feature of our present invention, so formed the clutch faces that they may be readily disengaged when the clutch is to be disengaged, and still said faces will transmit the required forces from the shaft to the clutched drum. To this end we have formed the clutch engaging faces with a slight slant backwardly from parallelism to the drum axis so that during the disengaging movement of the movable clutch element (which movement is in direction parallel to the shaft axis) there is an immediate tendency for the companion clutch faces to disengage from each other. This tendency is proportionate to the sine of the backward angle which said clutch faces make with respect to a plane extending through such clutch faces and parallel to the shaft and drum axis. The clutch faces of both clutch elements are formed on the same angle (just referred to), so that when the clutch is engaged the companion faces of the two clutch elements come into flat engagement with each other for transmission of driving forces.

Since the driving forces are transmitted through these faces which are formed at a slight angle with respect to the plane parallel to the shaft axis it follows that the driving force being transmitted between said faces will create a component of force in the direction of the shaft axis. This force tends to cause the clutch elements to disengage from each other. By forming the faces at an angle less than the angle corresponding to the coefficient of friction between the metals from which the clutch elements are formed this disengaging component of force will not be large enough to cause clutch disengagement under static conditions of force transmittal; but due to vibrations and the like attendant on the operation of the car puller there will actually be created a tendency for the two clutch elements to disengage unless restrained from such disengagement. Accordingly we have made provision for locking the drums against endwise movement along the shaft in the disengaging direction, and we have also provided for positively locking the movable clutch element against disengaging movement away from the corresponding drum clutch during driving engagement of the two clutch elements with each other. Accordingly when the movable clutch element of one clutch has been engaged with the corresponding drum clutch element for drive of such drum said movable clutch element is restrained against disengaging movement until the clutch elements are purposely reversed for drive to the other drum.

We have provided motor means to shift the clutch elements for change of drum drive, and suitable connections from such clutch motor to the clutch moving elements. In this connection we have also provided brake means in connection with clutch shifting motor and connections, which brake means is normally engaged for braking when the motor is not energized to shift the clutch elements. This braking means therefore serves to strongly retain the clutch elements in that position to which they have been moved; and also serves to receive and resist the tendency for the clutch element to be moved away from engagement with the corresponding drum clutch element during drive.

The clutch shifting means includes means to shift both of the movable clutch elements (for the two drums) harmoniously in either direction as required for clutch change. Since the clutch engaging portions of the companion elements of each clutch look towards each other it follows that when such clutch is to be engaged these elements must come together in such manner as to allow their driving faces to come into registry without difficulty in case the movable clutch element and the corresponding drum clutch element do not happen to occupy exactly the correct positions to allow them to be immediately brought into final driving registry. Thus, in case the drum happens to occupy an angular position such that its clutch teeth will prevent complete clutch engagement provision must be made to allow for subsequent completion of the clutch face engagements. We have made such provision herein.

In connection with the foregoing we have also made provision for positively withdrawing the previously engaged clutch element from its corresponding drum clutch element, and for at the same time applying to the previously non-engaged clutch element a yieldable force sufficient to normally move such clutch element in the clutching direction, and yet capable of yielding in case of non-registry of such previously non-engaged clutch element with the corresponding drum clutch element when brought against such drum clutch element under such non-registry condition. This yieldable force element then permits the clutch moving means to complete its full movement under the drive of the clutch shifting motor, with corresponding complete disengagement of the previously engaged clutch from its drum element, and with setting of the clutch motor brake at completion of such movement; and thereafter as the shaft is power-rotated the yieldably pressed clutch element will move into complete engagement with the corresponding drum clutch element, and thereafter power drive to the now completely clutched drum will occur and will continue as long as desired.

We have mentioned that the driving forces to be transmitted through these clutches may be very large. We have therefore provided a number of clutch engaging faces on each clutch unit, there being six such faces on each element of each clutch in the construction hereinafter described. These faces should be very accurately finished so as to ensure transmittal of drive to all of these faces with corresponding division of the total force between the several faces simultaneously engaged. There will, however, be wear of such faces with heavy usage of the car puller and corresponding frequent shifting of the clutches from one position to the other. In order to enable removal and replacement of worn or imperfect clutch elements without the need of completely dismantling the drums from the shaft of the car puller we have sectionalized each clutch element or ring so that said sections may be individually disconnected from their supporting bases, and so that proper replacements may thereafter be made and secured in place. These clutch sections are also so formed and supported that the large driving forces delivered through them are transmitted through tongue and groove supports which extend substantially radially of the units.

Even when the clutch faces are accurately finished so as to ensure good driving engagement between all or most of the faces of each clutch, still it is evident that dirt or other foreign matter gathering on said faces would destroy such intended result of plural face drive, with attendant increase of driving forces on the faces doing the driving. Furthermore, it is intended, as previously stated, that the actual engagement of the moving clutch element with the companion drum clutch element shall occur under such yieldable force condition, in case the two clutch elements were not in exactly correct relative positions when clutch shift occurred. To ensure this result it is desirable to avoid creation of unintended frictional resistance to clutch movement as by accumulation of dirt and the like on the relatively movable surfaces of the shaft and the movable clutch element.

We have therefore provided for enclosure of the clutch elements and their surfaces within substantially tight enclosures which will effectively prevent the incursion of dirt and other foreign matter to said parts. These enclosures are of such form and nature that they permit of necessary rotary drum movements while the clutch shifting elements do not correspondingly rotate; and also these enclosures are of such form and nature as to permit of the necessary back and forth movements of the clutch shifting elements which must extend from within such enclosures to locations outside thereof so that they may be properly actuated.

A further feature of the present invention concerns itself with the provision of remote control means to control the direction and starting and stopping of movements of the car puller unit so that said unit may be controlled from points remote from the unit itself, and from points which are convenient to the operator or person in position to observe the car which is being brought into loading or unloading position. Thereby it is possible to operate the car puller to ensure exact car positioning at the loading or unloading stand.

In connection with the foregoing we have also made provision for ensuring stoppage of car puller operation at limit positions corresponding to permissible limits of car puller or other movement. Conveniently these limit switches are functioned by engagement of suitable clamps carried by the draw cable itself so that these clamps must move in exact harmony with the car pulling connection itself. The draw cable passes over suitable pulleys defining its path of travel, as already stated, and there will necessarily be varying degrees of sag in the cable between these supporting pulleys. Accordingly the clamps carried by such cable will change in elevation during cable travel and therefore provision must be made to ensure proper registry of such clamps with the limit switch operating elements as the clamps approach such limit switches. We have made such provision in the present disclosures.

Other objects and uses of the invention will appear from a detailed description of the same, which consists in the features of construction and combinations of parts hereinafter described and claimed.

In the drawings:

Figure 4 shows an end view of the car puller shown in Figures 1 and 2, looking at the right hand end of the unit;

Figure 5 shows a section taken on the lines 5—5 of Figures 1, 2 and 3, looking in the directions of the arrows;

Figure 6 shows a cross-section taken on the lines 6—6 of Figures 1, 2 and 3, looking in the directions of the arrows;

Figure 7 shows a fragmentary section taken on the lines 7—7 of Figures 1, 2 and 3, looking in the directions of the arrows, but on enlarged scale, and this section shows the details of the drag element of the right hand drums;

Figure 8 shows a detailed elevational view of the bracket which pivotally supports the lever bar of the drag shown in Figure 7;

Figure 9 shows a fragmentary section taken on the line 9—9 of Figure 7, looking in the direction of the arrows, but on enlarged scale;

Figure 10 shows a plan view of the reciprocable bar for shifting the movable clutch elements, on enlarged scale as compared to Figures 1, 2, 3, 4, 5 and 6;

Figure 11 shows a side elevational view corresponding to Figure 10;

Figure 1:
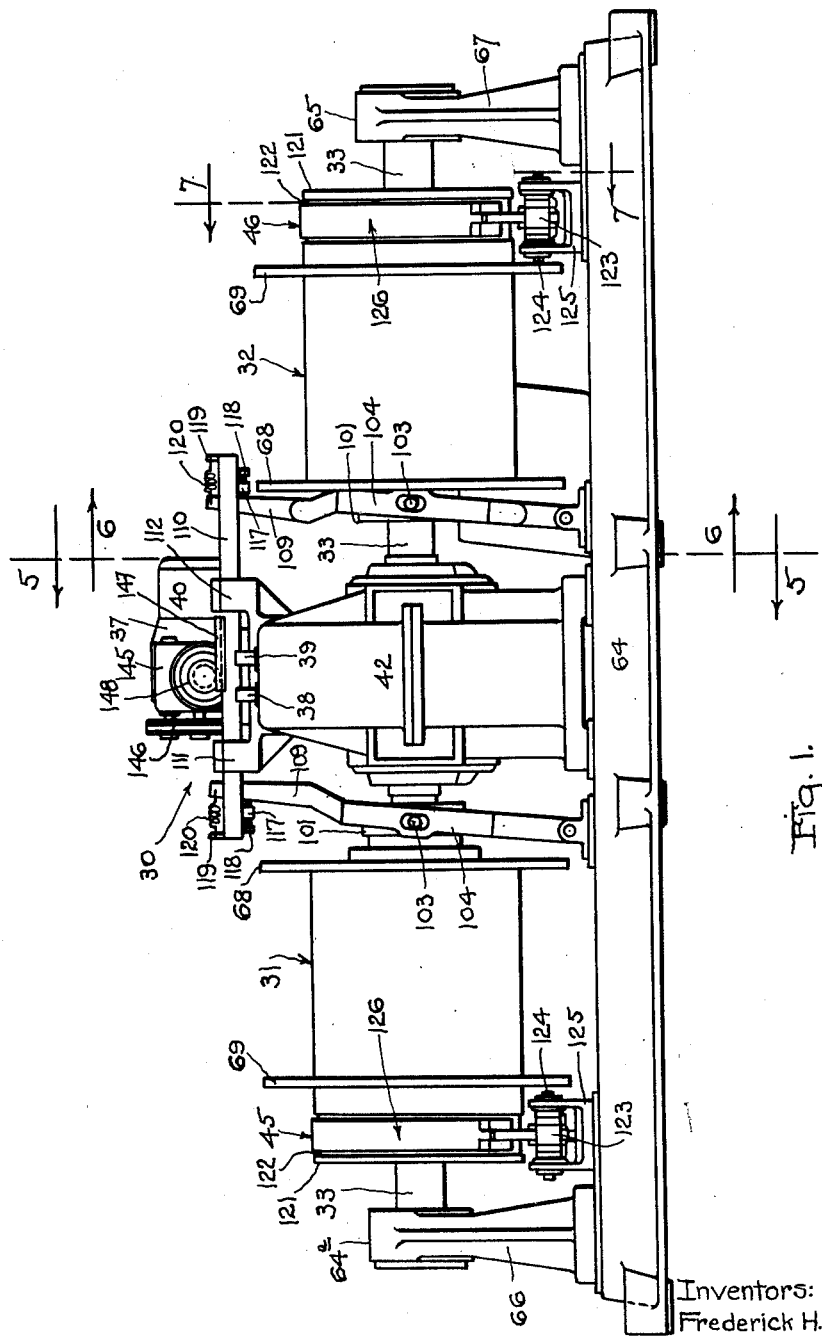
Figure 1 shows a front elevation of a car puller unit embodying the features of the present invention, the clutch shifter being moved to position for engaging the drive shaft with the right hand drum.

Figure 12 shows a fragmentary horizontal section taken on the line 12—12 of Figure 6, looking in the direction of the arrows; and it shows an enlarged detail section through the companion left hand clutch elements in disengaged position; and this section shows one form of guard around the clutch engaging elements which guard bears against the adjacent end face of the corresponding drum with a rotary sliding engagement to allow for drum rotation while the guard remains stationary; and Figure 12 is also a section taken on the line 12—12 of Figure 13, looking in the direction of the arrows;

Figure 13 shows a fragmentary section taken on the line 13—13 of Figure 12, looking in the direction of the arrows, and this figure shows a detail face view of one of the companion clutch elements, showing the sectionalized form thereof;

Figure 14 shows a fragmentary section taken on the line 14—14 of Figure 13, looking in the direction of the arrows, and it shows the fact that the engaging face of the clutch element is formed at an angle with respect to the plane passing through such face and through the axis of rotation;

Figure 15 shows a fragmentary section taken on the line 15—15 of Figure 13, looking in the direction of the arrows, and it shows the tongue and groove connection of the clutch section element with the base by which it is supported;

Figure 16 shows schematically a typical layout of an application of the car puller improvements herein disclosed to a two track loading or unloading and/or filling location, the central portion of the layout being cut away to shorten the figure;

Figure 17 shows a schematic wiring diagram for the circuits of the layout shown in Figure 16;

Figure 18 shows a plan view of a form of limit switch operating unit;

Figure 19 shows a side elevation of the unit shown in Figure 18;

Figure 20 shows a layout for movement and control of a car string by use of a car puller embodying the features of the present invention, similar to the layout shown in Figure 16; being a layout in which the car puller is located between two adjacent parallel tracks with the two sides of the cable loop extending parallel to said tracks, and with fixtures for connecting cars on either or both of said tracks to the cable for car movement on either or both of said tracks;

Figure 21 shows a layout for movement and control of a car string by use of a car puller embodying the features of the present invention, wherein one run of the cable loop lies parallel to a track, and the leads to and from the car puller drums extend at right angles to the direction of the track, with the car puller located adjacent to one end of the track section along which cars are to be moved, or adjacent to one end of the run of cable attachment;

Figure 22 shows a layout similar to that of Figure 21, but with the car puller located between the two extreme limits of movement of the attaching fixture by which the car string is at positions of limited movement of the bar 110

Figure 23 shows a fragmentary front elevational view of a modified form of shifting means for the clutch operating bar, being a manually operated arrangement; and Figure 24 shows a plan view corresponding to Figure 23.

Referring first to Figure 16, the car puller unit is designated in its entirety by the numeral 30. It includes the two drums 31 and 32 which are freely journalled to the shaft 33, and clutch elements 34 and 35 are provided whereby either drum may be selectively clutched to said shaft by shifting the clutch bar 110 towards one drum or the other. The clutch control motor 37 is provided for effecting movement of this bar 110 in one direction or the other, such motor being reversible and controllable from a distance if desired. The two limit switches 38 and 39 are provided for cutting off this clutch control motor at positions of limited movement of the bar 110 in the one direction or the other. This clutch motor assembly is provided with a normally set brake element 40 so that when said motor is not energized said brake is locked to hold the motor, and also the clutch bar 110 against movement until the clutch motor is again energized for movement to shift the clutch bar in the other direction, to the opposite clutching position.

The shaft 33 may be driven by a power motor 41 through a gear reducer element 42, and the power motor shaft 43 is provided with a brake wheel or pulley 44 which is normally engaged by suitable brake shoes to normally lock said wheel against rotary movement, thus normally locking the shaft 33 against movement when the power-motor is not energized. Thus the drum 31 or 32 which is at the time clutched to said shaft will also be locked against backward rotation, that is, rotation against the driving direction of such clutch. Each drum is provided with a drag which will exert an adjusted amount of braking action against backward rotation of such drum, that is, a braking action to resist unwinding rotation of such drum; but this drag is so arranged that it is substantially ineffective to exert any substantial amount of braking effect when the drum is being rotated in the forward or winding direction. These drags are shown at 45 and 46 in Figure 16.

The layout shown in Figure 16 is one in which the car puller is adapted to move cars on either or both of two parallel track sections. These are the tracks 47 and 48. A pulling cable 49 extends from an anchor to one drum, 31, along the track section 47 and parallel thereto for a distance corresponding to the specified amount of car pulling movement, to the pulley 50. From this pulley 50 the cable is carried over to a pulley 51 adjacent to the extreme limit of car pulling movement for the track 48, and thence the cable extends along parallel to the track section 48 to the drum 32 to which drum the other end of the cable is anchored. The drums are of such size as to allow for winding a length of cable somewhat longer than the maximum specified amount of car pulling movement. The cable is provided with a ring or other suitable fixture 52 at a proper position in its length, and the car string is connected to this ring or fixture by means of a short length of cable 53 which has the hook or other suitable fixture 54 secured to its end. Reference to Figure 20, which is a showing of a layout similar to that of Figure 16, will show that this attaching hook or fixture 54 should be capable of effective movement through a distance sufficient to meet the requirements for cable pulling along the track section 48. A similar attaching hook and the corresponding ring 55 and 56 are provided in that portion of the cable lying parallel to the track section 47, and these must be capable of movement along that track section for a distance sufficient to meet the requirements of that track section. In this layout one attaching fixture is adjacent to the car puller unit location, 30, when the other attaching fixture is at the far end of the track section, and as one fixture moves towards the car puller unit the other fixture moves away from the car puller unit, and vice versa. In other words, the car attaching fixtures are carried by the cable loop, and each such fixture must be capable of making the necessary extent of movement parallel to the track section being served by it.

When the fixture 55 is closest to the drum 31 there is wound on said drum an amount of cable sufficient to allow for movement of said fixture away from the drum a distance at least equal to the full travel of said fixture away from the drum; and the movement of said fixture 55 away from the drum 31 is effected by winding of cable on the other drum 32, such winding drawing cable over the two pulleys 50 and 51. Also, during such winding of cable onto the drum 32 the fixture 52 is approaching the drum 32 and the cable is winding onto said drum; and said drum must be capable of receiving a length of cable sufficient to accommodate the amount of movement of the fixture 52 along the track section 48.

By attaching both of the cable end portions to their respective drums in such manner that the lays of cable running from both of the drums are either from the bottom or the top tangents of the drums it is seen that for cable movement in either direction the two drums will rotate oppositely. Thus, by bringing both runs of the cable off from the bottom tangents of their drums, winding rotation of one drum will be clockwise when viewed from the lower edge of Figure 16, and the unwinding rotation of the other drum will be counterclockwise when viewing the car puller unit from the lower edge of Figure 16. The shaft 33 is always driven in the same direction for drum drive, being clockwise when viewed from the bottom of Figure 16, and when one drum is clutched to said shaft the other drum is unclutched from said shaft but is restrained from too free rotation counterclockwise by its drag brake. The details of construction of the unit 30 will be described presently.

In the layout shown in Figure 21 the single track section 57 is served, the cable length 58 of the cable loop extending parallel to this track section, and the fixture 59 being connected into this cable length. In this layout the cable passes over the two pulleys 60 and 61, defining the cable length 58, and the cable returns from the pulley 60, passing over the additional pulley 62. From the pulleys 61 and 62 the cable extends to the two drums 32 and 31, respectively. In this layout the car puller unit is located adjacent to one extreme limit of car pulling movement. In Figure 22 there is shown another form of layout similar in some respects to that of Figure 21; but in the present case the car puller unit is located at a position between the two limits of car pulling movement, and to do this the cable is also brought over the additional pulley 63. It will be observed that in the arrangement of Figure 20 the shaft of the car puller unit extends at right angles to the direction of car pulling movement, whereas in both of Figures 21 and 22 the shaft of the car puller unit extends substantially parallel to the direction of car pulling movement. Also, in Figure 21 the car pulling unit is located adjacent to one extreme of car pulling movement, whereas in Figure 22 the car pulling unit is located within the limits of car pulling movement.

The several layouts thus described are typical of some applications of use of the car puller unit herein disclosed, and are not to be understood as illustrating all of the possible applications of use of such car puller unit as various other applications of such use will suggest themselves to the engineer.

Provision has been made for control of the car puller unit for pulling in either direction, and for stopping at any exactly selected position, and for locking the car puller at stopped position; and such controls may be effected either locally at the location of the car puller unit, or remotely, from one or more remote control stations, as will be hereinafter disclosed. Such remote control stations, when provided, may be located at points convenient to the person supervising the car operations, and/or at points where the cars may be readily observed as they are successively brought into loading or unloading positions.

The car puller unit includes a suitable base section 64 which is provided with a long front portion which carries the pedestals for the shaft journals, etc., and said base section is also provided with a rearwardly extending back portion which carries suitable pedestals for carrying the power motor, the brake therefor, and the rear portion of the gear reducer.

The shaft 33 is journalled at its ends in the bearings 64$^a$ and 65 carried by the pedestals 66 and 67 which extend up from the base section. Journalled on this shaft symmetrically with respect to the center line of the unit, are the two drums 31 and 32, already referred to. Each of these drums is provided with the end flanges 68 and 69 to limit cable laying, and preferably each drum surface is smooth and un-grooved. The cable carrying capacity of each drum is sufficient to accommodate a length of cable somewhat greater than the maximum cable movement for which provision has been made, and corresponding to the maximum car pulling movement intended. Such amount of cable may be received on the drum in one or several lays according to the design of the car pulling unit. When more than one lay of cable is made the incoming cable will execute its lays progressively without the need of providing a special cable layer, as will hereinafter appear. The cable ends are anchored or secured to the respective drums close to the flanges thereof, and when the attaching fixture 52 is at one extreme of its movement there is wound on one drum an amount of cable somewhat more than the total car pulling movement, and there is wound on the other drum some small amount of cable to take care of emergencies and avoid unintended locking of movement due to lack of spare cable on the drum. Furthermore, both cable ends are brought to their respective drums preferably at the bottom tangents to said drums, as already explained. Accordingly, for clockwise drum rotation when viewing the unit as in Figure 6 (also when viewing the unit from the bottom of Figure 16), cable will be drawn onto the drum; and release of cable from a drum must be accompanied by counterclockwise drum rotation.

The power motor 41 is a uni-directional motor. It drives the high speed shaft 70 of the gear reducer element 42 through the coupling 71, and the power brake element 44 includes the brake drum 72 which is normally engaged by the brake shoes 73 under effect of the brake setting spring 74 so that this brake is normally set or locked. There is provided a solenoid 75 which when energized will draw its armature 76 down to disengage the brake shoes against the force of the spring 74, this armature acting through the lever arrangement 77. Thus the brake may be disengaged by supply of current to the solenoid 75, and such disengagement will continue only as long as said solenoid is energized. The arrangement is such that this solenoid is energized concurrently with supply of power current to the motor 41, and so that as soon as said motor is de-energized the brake will be set by its spring 74 to lock the shafts against rotation.

The gear reducer may be of any suitable design, and the details of construction thereof need not be specified herein. The reducer illustrated is one having the reducing gear train including the pinion 78 meshing with the gear 79, the pinion 80 meshing with the gear 81, and the pinion 82 meshing with the final or low speed gear 83. This final gear is keyed to the shaft 33 to drive the same with a very large possible torque. The arrangement illustrated is one having an overall gear ratio of substantially 233/1, so that the final shaft speed will be 1/233 of the speed of the motor 41, and the delivered torque will be 233/1 of the motor torque (disregarding usual losses). Since the shaft 33 need be driven in but one direction the power motor and its controls may be for uni-directional motor operation. In the showing of Figure 5 the motor shaft 70 should rotate clockwise when viewed as in Figure 5 in order that the shaft 33 shall rotate counterclockwise when viewed as in that figure, corresponding to clockwise drum rotation when viewed as in Figures 6 and 16.

Figure 3:
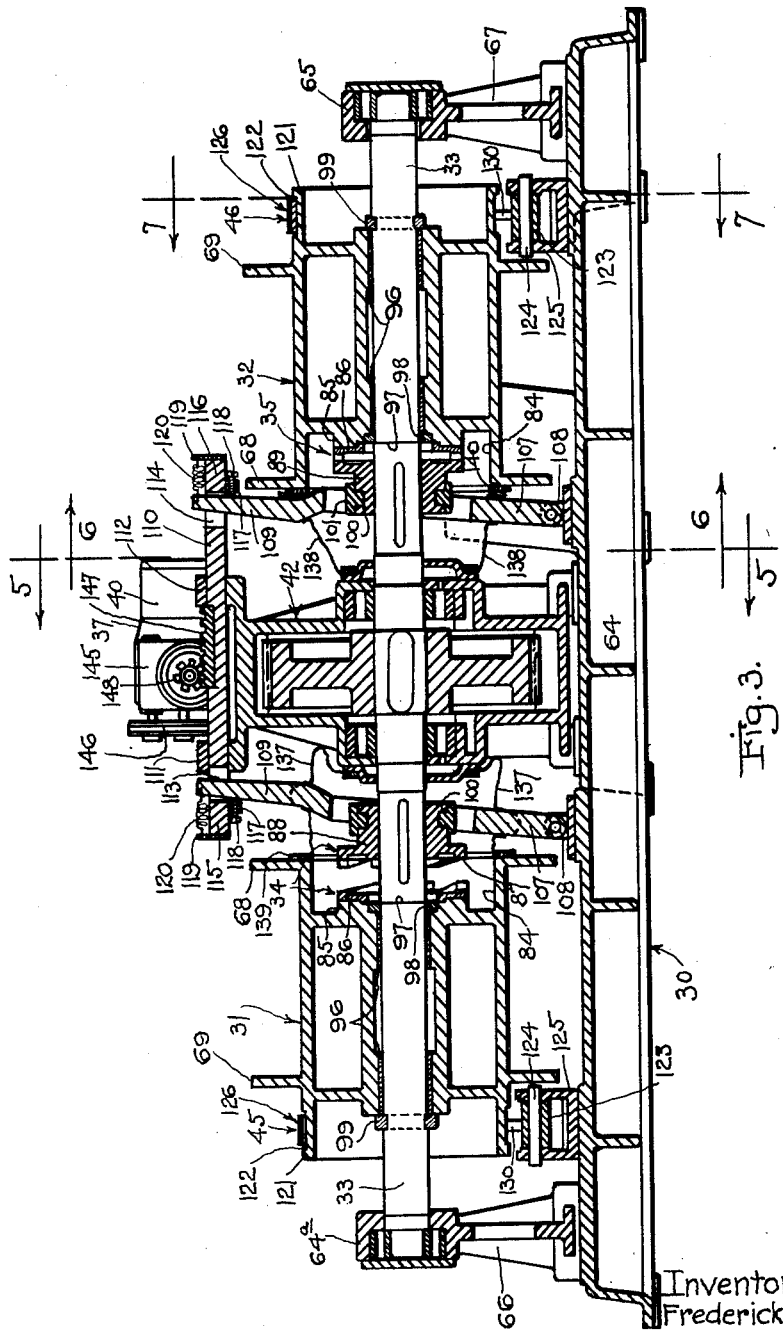
Figure 3 shows a longitudinal section through the drums and related elements of the car puller, being a section taken on the lines 3—3 of Figures 2, 4 and 5, looking in the directions of the arrows.

Both of the drums are identical, both as to size and design, but they are set onto the shaft 33 reversely, as is evident from various of the figures, including Figure 3. These drums are provided with the recessed portions 84 facing towards each other. The inner hub end 85 of each drum is faced to receive a driven clutch element of ring form, 86, and slidably mounted on the shaft 33 are the companion ring form clutch elements 87. These clutch elements 87 are carried by the corresponding movable clutch carrier blocks 88 and 89 which blocks 88 and 89 are keyed to the shaft 33, by spline keys which allow for the necessary clutching and unclutching movements to be executed.

Each driven clutch element 86 is provided with a number of teeth 90 having faces 91 against which companion driving faces of the driving clutch element 87 may engage. Likewise each driving clutch element 87 is provided with teeth 92 corresponding to the driven teeth 90, and these driving teeth are provided with faces 93 which may drivingly engage the faces 91 of the driven teeth 90. In Figure 12 the clutch element 87 has been disengaged from the driven clutch element 86 by movement of the carrier block 89 towards the right. Clutch engagement will occur by movement of said carrier block towards the left in Figure 12, the position of the drum and the driven clutch element 86 remaining unchanged along the shaft 33.

In the figures the clutch elements are provided with six teeth spaced at 60 degree intervals around such elements. It is evident that these teeth should be accurately formed and finished in order that engagement of all or several teeth shall be ensured each time a clutch is brought into clutching position. We have formed each of the clutch elements 86 and 87 of sectional form, with one section corresponding to each tooth, as well shown in Figure 13. These are the sections 87$^a$, 87$^b$, 87$^c$, 87$^d$, 87$^e$ and 87$^f$ shown in Figure 13, and the showing of this figure is also typical of the other clutch elements. These sections are shown as being held to the bases to which they are connected, by the screws 94, and these sections are also drivingly secured to their base supports by the key and slot arrangements as shown at 95 in Figure 13, and in Figure 15 in section.

With the foregoing sectionalized clutch element construction it is evident that said clutch elements may be removed and replaced or other elements substituted from time to time if desired, in case of wear or need of refinishing the surfaces 91 and 93, or for other reasons, without the need of completely dismantling the shaft and drum assembly of the car puller.

During driving engagement of a drum with the shaft 33 said drum of course rotates with the shaft, being driven thereby. The other drum, unclutched, at the same time rotates backwardly on the shaft at substantially double shaft speed. Accordingly, we have journalled both drums on the shaft 33, by provision of the bearing sleeves shown at 96 in Figure 3. These bearings may, if desired be lubricated by suitable means, not shown in the figures.

The shaft 33 is provided with a shoulder 97 at position for engagement by a thrust ring 98 set against the inner or clutch end of each drum; and adjacent to the outer end of each drum is a groove provided in the shaft to receive a split ring 99 for preventing outward end thrust of such drum. Thus each drum is nicely locked in position on the shaft 33, and is accurately held against endwise movement in either direction. It is here noted that end thrust on a given drum tending to move it outwardly away from the clutch position is developed when said drum is clutched to the shaft and a driving force is being transmitted from the shaft to such drum. This end thrust will be resisted by the split ring 99 at the outer end of such drum, to retain the drum in proper location on the shaft regardless of such end thrust. It is also noted that such end thrust due to clutch drive is only developed while the shaft is rotating and transmitting force to the drum, but at such time the drum is rotating with the shaft so that no frictional movement will take place between the split ring and the outer end of the drum while said split ring is under thrust load.

Each of the carrier blocks 88 and 89 is keyed to the shaft 33 as already explained. These carrier blocks are shifted back and forth to control clutching and unclutching operations as follows:

Each carrier block is grooved as shown at 100 (see Figures 3, 6 and 12), and a split collar 101 is placed around such carrier block, being provided with an inwardly extending tongue 102 which engages the groove 100. This collar is provided with the opposite studs or pins 103, preferably extending out horizontally from the collar. A rock yoke 104 is provided for each clutch unit, and has its central portion provided with an opening of size sufficient to receive the collar 101. This construction is shown in Figure 6. The yoke 104 is formed of the companion sections 105 and 106 which are secured together; and the section 105 is provided with the downwardly extending arm 107 which is pivotally connected to a bracket 108 carried by the base section. Said section 105 is also provided with the upwardly extending arm 109 which is controlled by means to be presently disclosed, for rocking the yoke on its lower end pivot, and to thus shift the carrier block 89 back and forth. Here it is mentioned that this shifting means is such that both of the upwardly extending arms 109 for the two yokes are always moved simultaneously, or harmoniously, in the same direction, so that clutching function of one clutch is accompanied by unclutching function of the other clutch. Generally the unclutching function of one clutch will precede the final termination of the clutching function of the other clutch, for reasons which will presently appear.

At an elevation to effect convenient connections to the two upwardly extending arms there is provided the horizontally extending clutch operating bar 110. Conveniently this bar is mounted in the slide bearings 111 and 112 on the upper portion of the gear reducer housing, the arrangement permitting back and forth sliding of said bar. This bar has its two ends inwardly slotted to provide the end slots 113 and 114, and blocks 115 and 116 are set into the outer end portions of these two slots to close said outer ends, leaving open slots inwardly of such blocks 115 and 116. The upper end portions of the arms 109 for the two yokes extend into or through these open slot portions as well shown in Figures 1, 3 and 6. Each of the blocks 115 and 116 is provided with a downwardly extending lug 117 which lies to the outside of the upper end portion of the arm 109, and an adjustable stop screw 118 is provided in each of these lugs to establish a stop which will engage the edge of the arm 109. Each of the blocks 115 and 116 is provided with an upwardly extending lug 119 which serves as an abutment lying to the outside of the upper end of the corresponding arm 109, and a spring 120 is provided between each such lug 119 and the upper end of the corresponding yoke arm 109. Such spring therefore tends at all times to retain the arm 109 against the stop pin or stud 118, but the open portion of the corresponding slot 113 or 114 is sufficiently long, measured inwardly along the bar 110, to allow said bar to move a certain amount in either direction without the inner end of the slot coming into direct engagement with the inner edge of the arm 109. That is, in case the yoke at the left hand side of Figure 3, being the yoke for the drum 31, should be locked temporarily against movement towards the left, such leftward movement of the bar 110 could nevertheless occur, the stop pin 118 moving away from the arm 109, and the spring 120 which is connected to that arm 109 stretching to produce a force on the yoke arm. This spring force will tend to move that yoke arm towards the stop pin 118 as soon as the restraining force which has been holding the yoke against movement is removed. When such restraining force is removed the spring will draw the yoke to its full moved position, and until its arm 109 comes into engagement with the stop pin 118 at that end of the bar 110.

It will be seen that the foregoing functions are such that movement of the bar 110 in either direction will produce a positive disengaging movement of one of the clutch carrier blocks 88 and 89, to positively disengage the previously engaged clutch, and at the same time the movement of the other clutch carrier block will be under spring tension, of sufficient magnitude to ensure movement of that carrier block in the clutching direction until said carrier block's movement may be barred by some positive obstruction. When that condition occurs the continued movement of the bar 110 will continue to move the first mentioned carrier block in the unclutching direction to ensure completion of such unclutching operation, but such obstruction to movement of the second carrier block in the clutching direction will for the time being arrest further movement of that carrier block in the clutching direction, but with the corresponding spring 120 under stretched condition and exerting a strong force tending to complete the carrier block movement to bring about fully clutched condition. Therefore, as soon as the obstruction which arrested the carrier block movement is removed such carrier block movement will resume and will continue to completion for final and full clutching effect.

The arresting action referred to above will be caused by premature contact of the teeth 92 of the clutch element with the teeth 90 of the clutch element 86. That is, as the carrier block 89 moves towards the clutch element 86 the extreme faces of the teeth 92 will come into contact with the slanting portions of the backs of the teeth 90 and full movement of the carrier block 89 cannot occur until the angular position of the shaft and the carrier block 89 is correct to allow full engagement of the teeth 92 with the teeth 90. Therefore it will almost always happen that as the carrier block 89 is moved over in the clutching direction such arrestment will occur prematurely and with the spring 120 under tension. Thereafter as rotation of the shaft and the carrier block occurs the teeth 92 will move to carry their faces 93 towards the tooth faces 91 until finally contact of said tooth faces occurs and drive of the driven element begins. Until such driving engagement occurs the carrier block will move slowly to its finally fully clutched position under force of the spring 120.

Referring again to the disengagement of the previously engaged clutch, during the foregoing change of clutching conditions, it will be seen that such disengagement requires shift of the faces 93 of the previously engaged clutch element from the faces 91 of such clutch element. These faces have previously been in driving contact and high pressures have been transmitted through them. If these faces lie in planes parallel to the shaft, and the clutch disengagement is produced by movement of the carrier element 89 without angular displacement with respect to the shaft during such movement, the disengagement of the clutch faces will have to occur by simple sliding movement, and without any accompanying component of motion of one face directly away from the other face. It has been found that such an arrangement frequently requires the application of very large forces to start the disengagement, since the high surface pressures to which the surfaces were subjected during power drive cause a molecular interlock of the two faces which can be broken only by application of large forces when said forces are parallel to the faces themselves. The foregoing condition is aggravated in the present instance by the following additional condition:

When drive has been occuring to one drum with corresponding wrap of cable on said drum, said cable has been under large tension and it has been necessary to transmit the needed large force through the clutch faces to effect such drive. As the driving operation ceases (due to cutting off current from the power motor 41), the power brake 44 sets in order to retain the drum against any backward rotation and thus to lock the car string in its new position. This braking action therefore occurs while the cable wrapping on the drum is still under tension and stretch, and therefore the clutch faces are still subjected to the large forces which they were exerting at the time of discontinuance of the operation. If the terrain on which the track lies includes an upgrade up which the car string is drawn it is evident that such grade will act to continue the strong facial engagement of the clutch faces indefinitely, and until the time arrives to reverse the clutch by proper movement of the bar 110. When that time arrives it will be necessary to disengage the clutch faces while a very large force is still being transmitted from the faces of one clutch element to the faces of the other clutch element.

In order to provide for ready and relatively easy disengagement of the clutch elements from each other we have formed the teeth faces 93 (of the element 87) and the teeth faces 91 (of the element 86) at a slight angle backwardly from a plane extending through said faces and lying parallel to the shaft axis, as shown in Figure 14. That is, these faces, instead of lying in planes parallel to the shaft axis actually lie in planes which are tilted with respect to the shaft axis as will be evident from comparison of Figures 13 and 14. In the said figures this tilt amounts to substantially 6 degrees as shown in Figure 14, but we do not intend to limit ourselves to this exact angle nor to any other exact angle, except as we may limit ourselves in the claims to follow. Study of this angular arrangement will show that even a very slight movement of the teeth 92 (carried by the carrier block 89), and without angular movement with respect to the shaft itself, will result in immediate commencement of direct disengagement of the faces 93 of said teeth from the faces 91 of the companion teeth 90. No sliding movement of said faces over each other will be required to effect such disengagement. Another way of stating the matter is the following:

Due to the tilted form of the teeth any slight movement of one surface with respect to the companion surface, such movement being axial and unaccompanied by any rotary movement, will at once result in a progressive separation of the faces of one set of teeth from the faces of the other set of teeth; and for any specified amount of movement of the teeth parallel to the shaft (due to carrier block movement) the amount of such separation of the tooth faces from each other will be measured as the amount of axial displacement multiplied by the sine of the angle of tooth tilt.

It is also noted that this slight tilt of the engaging faces of the clutch teeth creates a slight component of force in an axial direction between the companion clutch elements, and that such component of force tends to disengage the clutch elements from each other axially. However, this component of force axially is very small compared to the frictional engagement between the companion teeth themselves and therefore is never even approximately sufficient to cause actual disengagement of the companion clutch elements. However, this arrangement of the companion clutch faces greatly facilitates the disengagement of the clutch elements when such disengagement is desired. Such formation of the engaging clutch faces is referred to herein as being one in which the teeth faces 91 are formed at a slight angle backwardly from a plane extending through said faces and lying parallel to the shaft axis.

The outer portion of each drum is provided with an extension 121 which is formed with a cylindrical outer surface, and a slightly depressed surface 122 is provided in such cylindrical surface. We have provided a lever 123 pivoted at the point 124 adjacent to the extension 121. This lever is conveniently pivoted to a bracket 125 carried by the base section. A brake band 126 extends from one end or arm of the lever over the surface 122 to the other arm of the lever, the first end of said brake band being connected to the lever by the pivotal connection 127, and the second mentioned end of the brake band being connected to the lever by another pivotal connection 128. The two points of connection, 127 and 128 are located at different distances from the pivotal point of the lever itself, 124, so that the two lever arms, 124—127 and 124—128 are of different lengths. The pivotal connection 128 is such as to enable production of a slight spring tension of the brake band over the surface 122. For this purpose a block 129 is pivotally connected to the lever at the axis 129, and a stud 130 is freely passed through this block 129, the end of the brake band being connected to the stud 130 at the point 131. The stud carries an adjustment nut 132 on its projecting end portion, and a spring 133 is located between this nut and the block 129. By adjustment of this spring the brake band may be placed under a relatively light normal tension so that it normally engages the surface 122 with sufficient frictional engagement to start proper braking or dragging response as will now be explained.

During winding rotation of the drum to which this drag device is connected rotation will be counterclockwise when viewed as in Figure 7, and unwinding rotation will be clockwise. The weight of the lever itself tends to rock said lever clockwise (when viewed as in Figure 7), and if desired said lever may be weighted as shown by the small weight 134 in said figure. With this arrangement it will be seen that during unwinding rotation (clockwise) the brake band tends to follow the drum rotation. This tendency causes the brake band to follow the drum rotation clockwise for a slight angular displacement, thus pulling up the band connection 127 slightly and correspondingly slightly rocking the lever with resulting lowering of the longer lever arm 124—128. Necessarily any rock of the lever clockwise will result in much greater movement of the longer arm 124—128 than of the shorter arm 124—127. Accordingly such clockwise rock must result in drawing the right hand end of the brake band downwardly faster than the left hand end of said brake band is released upwardly, and this must result in a tightening of the grip of the brake band on the drum surface 122. The presence of the spring allows some further lever movement to occur, due to grip of the band on the drum surface, with corresponding tightening of the spring 133, and corresponding increased grip on the drum surface. Thus the gripping action of the brake band on the drum surface will increase until resistance of the spring 133 prevents further lever rock, and thus arrests further increase of the braking effect. This condition having been attained, the continued drum rotation clockwise (unwinding) will occur with a substantially constant but large braking resistance, the amount of such braking resistance being determined largely by the setting of the nut 132 and the characteristics of the spring 133. It is intended that this resistance shall be such as to maintain the cable taut as released from the unwinding drum, so that fouling of the released cable shall not occur, and to allow such cable release to occur only at the rate called for by the winding of cable on the other drum.

Conversely, during winding rotation of the drum shown in Figure 7 the brake band will tend to follow the drum rotation counterclockwise. This action will tend to cause the right hand end of the lever to rise with corresponding lowering of the left hand end of said lever. Accordingly the pivotal point 131 will also rise and the pivotal point 127 will fall, and the rate of such rise will be much greater than the rate of such fall. The result will be that the grip of the brake band on the drum surface will be released instead of being increased as previously explained in the case of clockwise drum rotation. Thus when the drum is rotating for winding operation the dragging action is reduced practically to zero. Thus the drag on the power motor is reduced practically to zero, except for that needed to draw the cable onto the drum for normal car pulling operation.

Preferably the band 126 includes a flexible metal strip 135 carrying a series of formed composition brake blocks 136 to contact the drum surface, in accordance with good braking practice.

Reference to Figure 3 will show the flexible boots 137 and 138 extending from the gear reducer housing to contact with the inner drum ends. These boots may be made of suitable substantially air tight material such as rubberized cloth or the like secured to the reducer housing around the shaft bearings. These boots extend past the upwardly and downwardly extending arms 109 and 107 of the clutch shifting yokes and the boots are secured to these arms in substantially air tight fashion. These boots extend over to contact with the inner end faces of the respective drums, but the boots are not connected to the drums which are thus free to rotate for the cable winding and unwinding operations. Conveniently the drum ends of these boots are provided with metal rings 139 and 140 which directly contact the drum ends in substantially tight fashion, and if desired spring means may be provided to maintain the rings 139 and 140 in firm engagement with said drum ends. The inwardly facing end surfaces of the drums may be finished to provide smooth surfaces against which the rings 139 and 140 engage. Thus the boots will maintain tight engagement with the drum ends while permitting necessary drum rotations.

The foregoing arrangement will ensure against entry of dust or other foreign matter to the clutch faces, and will also protect the oiled surface of the shaft from accumulation of such dust and foreign matter throughout the zone of movement executed by the carrier blocks 88 and 89 during clutching and unclutching operations. This protection against entry of dust and other matter to the clutch faces is desirable in order to ensure maintenance of good driving engagement of all of these surfaces during clutch drive. The non-entrance of dust and other foreign matter to the oiled portion of the shaft in the zone of movement of the carrier blocks is desirable in order to prevent accumulation of hard or sticky matter where it will interfere with proper movement of the clutch carrier blocks for their normal operations.

In Figures 12 and 13 we have shown a modified form of boot for protecting the clutch engaging surfaces against entry of dust or other foreign matter. In this case we have shown the disk of rubber or other material 141 extending outwardly from the carrier block radial face, and secured to said face by the clamping ring 142. The peripheral portion of this disk of rubber or the like is provided with a ring of contact metal 143 facing the inner end of the drum, and secured tightly to the periphery of the rubber disk by a companion ring 144 drawn towards the ring 143 by suitable means such as a series of through bolts or screws, not shown. With this arrangement the flexibility of the disk 141 is sufficient to enable necessary back and forth movements of the carrier block 89 while maintaining engagement of the ring 143 with the drum end surface. In case of need to maintain sufficient pressure of the ring 143 against the drum end surface, leaf springs or the like may be provided extending outwardly from the carrier block to engagement with the ring 144, to press the peripheral portion of the disk 141, or the ring 143, into firm engagement with the rotating drum surface.

It is to be noted that the drums 31 and 32 rotate at slow speed, such as 7½ R. P. M., so that the engagement of the boot periphery of either the form shown in Figure 3, or the form shown in Figures 12 and 13 with the drum end surface does not present difficulties due to high rate of drum rotation.

Reference has been made to the motor 37 for shifting the clutch control bar 110 back and forth. This motor is reversible. It drives the gear reducer element 145 through the medium of the belt drive 146. The bar 110 carries the rack bar 147 which is engaged by the pinion 148 carried by the final drive shaft 149 of the gear reducer 145. By this means the back and forth movements of the clutch control bar 110 are caused by rotation of the motor in proper directions. The brake element 40 is normally set to its braking position by spring means, not shown, so that normally both the motor 37 and the pinion 148 are locked against movement. Thus the clutch bar 110 is also normally retained against movement from a position to which it has been moved. The brake element 40 is interconnected with the motor circuit for the motor 37 so that whenever that motor is being supplied with operating current said brake element 40 is released to allow motor operation with attendant movement of the clutch bar 110.

In Figures 23 and 24 we have shown a modified form of device for shifting the clutch bar 110 back and forth. In this modified arrangement we have provided a hand operated lever 150 pivoted to the top of the gear reducer element 42 at the point 151 so that said lever may be rocked back and forth manually. This lever is connected to the lug 152 projecting backwardly from the clutch operating bar 110 so that rocking movements of the lever 150 are delivered to the clutch bar 110 as direct back and forth movements of said clutch bar. In this case the operator will effect change of clutch position by swinging the lever from one position to the opposite position, thus moving the clutch bar to the opposite position. The operator will then hold the lever in such new position until the clutch has become engaged, after slight rotation of the shaft 33 if necessary, whereupon the operator may release said lever, leaving the clutches in their newly attained positions. Or, if desired, means may be provided for latching the lever in either of its two extreme positions. Thus, the spring leaf 150ᵃ may be provided as shown in Figure 24, the same being anchored to the frame of the machine at 150ᵇ, and the outer end 150ᶜ of this spring leaf may be provided with notches in its upper edge into which notches the lever 150 will fall at the extremes of movement of the lever to lock the lever in such extreme positions until the spring leaf is intentionally moved to permit disengagement of the lever for a reverse rocking movement of the lever.

Conveniently also we have shown in Figures 23 and 24 the flexible boots 153 and 154 protecting the sliding supports 111 and 112 whereby the bar 110 is carried so as to prevent entrance of dust and other foreign matter to these supports.

Reference to Figure 20 shows the guide pulleys 155 and 156 over which the cable pass runs, which guide pulleys are located near the respective drums 31 and 32. As the cable winds onto or unwinds off from each drum it must lay back and forth along the drum length in order to ensure good laying on the drum. It has been found that by locating these guide pulleys 155 and 156 at distances of not less than substantially six times the axial length of the drum winding surface it is possible to ensure good laying of the cable on the drum without the need of providing special cable layers for this purpose. If the drum dimensions are such that several layers of cable must be accommodated on each drum it will be found that such placing of these guide drums 155 and 156 will ensure good laying of the cable on the successive layers wound on the drums.

As previously stated provision may be made for control of the car puller operations either locally at the position of that unit or remotely from one or more control stands. These stands may be located conveniently where desired so as to enable the operator to observe the car movements and make it possible for him to bring each car in turn to correct position. In case more than one such control stand or station is provided all such stands or stations may be so interconnected as to prevent conflict of signals from them to the car puller unit 30, and to ensure proper control from each stand in turn as used. Many electrical systems are known for producing such remote controls as are needed for properly controlling the unit 30, and therefore we do not deem it necessary to herein disclose any such system in great detail. However, we have disclosed some of the elements or units of one such system since they are directly related in their functions to the proper control of the unit 30.

In Figure 17 we have shown schematically two remote control stands designated as "East Control Station" and "West Control Station," respectively. Each of these is provided with suitable buttons or other elements whereby the unit 30 may be brought into operation for car pull in either direction as desired; and whereby the car pulling operation may be continued as long as desired by the operator; and whereby the car pulling operation may be brought to stop promptly by the operator. Each of these stations is also provided with control means designated properly according to the control operation to be produced. Thus, each such station includes control means designated as "East," "West," and "Stop," these designations corresponding to directions of car movement to be produced, and arrestment of such movements, respectively. The arrangement illustrated is such that the following operations may and will be produced:

Assuming that the car puller has been at rest, and that the clutching means stands in position with the drive elements clutched to the right hand drum, 32, in Figure 1, being the position shown in that figure; and assuming the drive of the drum 32 (as shown in Figure 1) produces "East" car movement; then operator movement of the control button of either control station for "East" will at once place in operation the necessary switches and control units to release the power motor brake 44 and supply power current to the power motor 41, thus starting "East" movement, the clutching elements remaining in the positions which they had previously occupied, since it was not necessary to change direction of cable movement. Having thus brought the car puller into operation for "East" movement, such movement will continue as long as the operator retains the control element "East" in operating position, or until he presses the "Stop" button or element. Thereupon such "East" movement will stop, and the power brake 44 will be allowed to lock the shaft 43, thus also locking the drum shaft 33 in the position of its stoppage, and thus also locking the drum 32 which is then clutched to said shaft 33. Subsequent and repeated "East" movements may be executed in like manner from time to time, each movement being under complete control of the operator to bring the car string to a new and controlled position of stoppage.

Such operations in the "East" direction may be continued until the maximum amount of movement in the "East" direction has been executed, whereupon there will come into play a limit switch which will prevent further "East" movements, but will not prevent reverse or "West" movements to occur. We shall disclose the details of such a limit switch presently herein.

At any time when the car puller is at rest the operator may bring about "West" movement. To do this he need only operate the "West" control button or switch at one of the control stations. Upon doing this the following sequence of operations will take place: the clutch motor brake element 40 will be released and current supplied to the clutch motor 37 in such manner as to cause that motor to move the clutch control bar 110 towards the left (in Figure 1 and elsewhere). This will cause disengagement of the clutch from the drum 32 and movement of the clutching elements to position for clutching engagement of the drum 31, all according to the principles of operation previously explained herein. At the same time the power motor brake 44 will be released and power current will be supplied to the power motor 41 to drive the shaft 33; and such drive of the shaft 33 will be in the same direction as for the previously executed "East" movements. The clutching of the shaft 33 to the drum 31 will then be completed, as previously explained herein, and drive to that drum will then proceed in normal manner. Such "West" drive will continue as long as the operator maintains the "West" control button in operating position, and until he presses the "Stop" button to discontinue the operation. When he presses the "Stop" button the supply of current to the power motor 41 will cease, and the power brake 44 will lock the shaft 43 against movement, to thus lock the drum 31 stationary as will be readily understood. It should also be mentioned that when the clutch operating motor has moved the bar 110 to its extreme limit of movement the limit switch 38 will cut off the current from said clutch motor 37 and set the brake 40, to lock the clutch operating bar 110 in its left hand position; but such movement of the limit switch 38 will be accompanied by establishment of circuits such that when the clutch motor 37 is again energized it will rotate in reverse direction, thus moving the clutch operating bar 110 towards the right for proper reversal of clutch positions.

Further and repeated "West" operations may be produced from time to time by operation of the "West" control button to institute each such repeated "West" movement, followed by operation of the "Stop" button for stoppage of each such "West" movement, as will be readily apparent. "West" movements may continue until there comes into operation a limit switch which will prevent further "West" movements, but which switch does not prevent "East" movements to be executed for return of the cable to various "East" positions.

It will of course be understood that various back and forth movements, first "East," then "West" and vice versa, may be executed within the limits of movement allowed by the limit switches previously referred to.

The following further descriptions of operational elements related to the foregoing car puller unit will facilitate understanding of said car puller operations.

Figure 2:
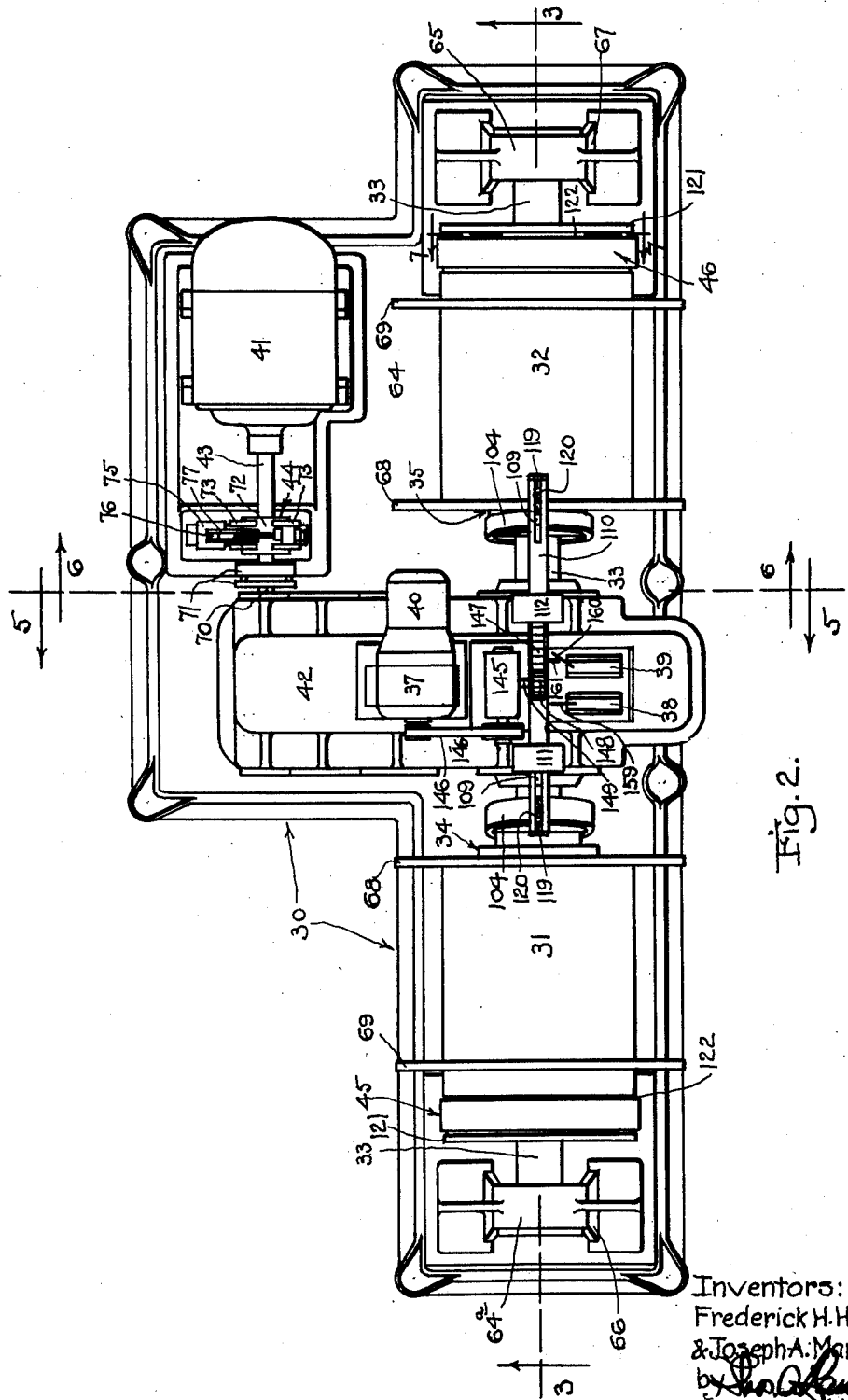
Figure 2 shows a plan view corresponding to Figure 1.

Referring to Figure 2 the clutch control limit switches 38 and 39 are provided with the rock arms 159 and 160, respectively for operation of said switches. These rock arms normally stand straight out, that is, rearwardly, as shown by the arm 159 of the switch 38, and in this position the switch is in its closed position. On the contrary, by rocking the arm 159 or 160 laterally, as shown by the arm 160 of the switch 39, the switch is placed in its open position. The clutch operating bar 110 carries a pin or lug 161 which will come into engagement with either the arm 159 or 160, according to the direction of movement of the bar 110, to thus rock the corresponding arm 159 or 160 for switch opening movement, to thus terminate the supply of current to the clutch motor 37, and to set the brake 40, according to principles already explained. At the time that one switch is thus caused to terminate current supply to the clutch motor, circuits are also established so that when a control button of one of the control stations is moved to the "East" or the "West" position (being that position opposite to the clutch position previously occupied), current will come to the clutch motor 37 to drive said motor and thus to reverse the position of the clutch operating bar 110, such reversing movement then continuing until terminated by operation of the other limit switch 38 or 39, as the case may be.

Springs are provided for returning the arms 159 and 160 to their normal or straight back positions, such as the position of the arm 159, when the bar 110 moves away from its previous position.

Details of the cable movement limit switches are shown in Figures 18 and 19 to which reference may now be had. Each of these units includes a switch element proper, 162, having a rock shaft or pin 163 whose upper end carries an operating arm 164 by which said shaft or pin may be rocked in one direction to thereby move the switch contacts to position opposite to the position which they previously occupied. The switch also includes spring means tending to restore the switch to its original or non-operated position, thus also restoring the arm 164 to its non-operated position. Adjacent to the switch element proper there is provided a vertical stud or pin 165 on which is journalled the rock arm 166 which carries the pin or lug 167 which will engage the rock arm 164 of the switch unit proper when said arm 166 is rocked against the force of a spring 168 to move said arm away from a stop pin 169. Normally this arm 166 is thus retained by the spring 168 against the stop pin, and likewise the switch arm 164 is allowed to be returned to its normal position by the spring within the switch unit. Under these conditions the limit switch does not discontinue operation of the car puller unit 30.

The arm 166 has hinged to it a further extension arm 170, such hinge being shown at 171. This hinge includes a horizontal pivot so that the arm 170 may swing up and down on said hinge, the arm 166 not swinging up and down but remaining in its substantially horizontal plane of movement; and the hinge 171 is such that lateral or horizontal movement or swing of the arm 170 will cause corresponding horizontal swing of the arm 166 no matter how much the arm 170 may be tilted up or down, within the limits permissible by the construction of the parts. Thus it is seen that lateral swings of the arm 170 will cause corresponding swings of the arm 166 while at the same time said arm 170 may be rocked up or down within rather large limits of such rocking movement.

The limit switches of the type now being described are located close to the cable run or runs, but in locations where said switches will not interfere with other elements of the arrangement. The outer end portion of the arm 170 of each limit switch is slotted as shown at 172 and the cable runs through such slot, the outer end of the slot being closed as shown in Figure 19 so as to prevent the cable from disengaging from the arm. At a proper point the cable carries a button or the like, clamped to the cable, and travelling with the cable back and forth during car puller operations. Such a button, 173, is provided for each limit switch, or in some cases one such button may be caused to serve both limit switches. As such button approaches the limit switch arm 170 and comes into contact with said arm, further cable movement will cause the arm to swing against the force of the spring 168 until finally the switch is actuated to change the circuits and discontinue power motor operation and setting of the brake 44 of the car puller unit 30. Under these circuit conditions no further drive of the cable in the direction in which it has been moving may be caused, but the operation of the limit switch so changes the various circuits that car puller operation may be instituted in the opposite direction, reversal of the clutch operating motor 37 being included in such new operations.

The up and down swing of the arm 170, permissible on the hinge 171, makes it possible for the limit switch arm 170 to follow the cable up and down swings, and maintain proper relationship to the cable, so that when the button 173 comes to the position of the limit switch the arm 170 will be properly swung to ensure limit switch operation.

We claim:

1. In a car puller the combination of a main drive shaft, means to journal the ends of said shaft, separate winding drums journalled on the shaft adjacent to the shaft journals and between said journals, the inner ends of said drums facing towards each other and being separated from each other, a toothed clutch element secured to the inner end of each drum, the driving faces of the teeth of both of said clutch elements facing in the same direction of drive, two independent driving clutch elements drivingly and slidably mounted on the shaft between the drum clutch elements, one for each drum clutch element, driving teeth on the shaft clutch elements adapted to drivingly engage the teeth of the drum clutch elements respectively, means to drive the shaft at a point between said shaft clutch elements, and common means to slidably shift both clutch elements harmoniously in either direction along the shaft to thereby engage the teeth of one shaft clutch element with the clutch teeth of the adjacent drum and to disengage the teeth of the other shaft clutch element from the clutch teeth of the other drum, said shaft clutch element slidable shifting means including a reciprocable clutch operating bar between the driving clutch elements, means to move said bar in either direction selectively, a clutch actuator for each of the driving clutch elements, an operative connection between each clutch actuator and the corresponding driving clutch element, a lost motion connection between the clutch operating bar and each clutch actuator, each lost motion connection being so constituted as to allow movement of the clutch operating bar with respect to its corresponding clutch actuator by an amount of movement sufficient to permit full movement of the clutch operating bar in clutch engaging direction and away from a clutch disengaging position of the clutch operating bar without corresponding movement of such clutch actuator, positive engaging means between the clutch operating bar and each clutch actuator positioned to ensure positive engagement of the clutch operating bar and each clutch actuator during movement of the clutch operating bar in direction to move such clutch actuator in clutch disengaging direction, and spring means between the clutch operating bar and each clutch actuator, each spring means acting to urge movement of the corresponding clutch actuator in direction to engage the corresponding driving clutch element with the companion drum clutch element.

2. In a car puller the combination of two winding drums, means to journal said drums for rotation, a toothed clutch element secured to one end of each drum, a length of cable comprising a cable loop, means to connect one end of said cable loop length to each drum, said clutch element teeth facing in directions for drive of each drum in direction to wind cable on said drum with corresponding unwinding of cable from the other drum, an axially shiftable driving clutch element for each drum and having clutch teeth adapted to drivingly engage the teeth of the corresponding drum clutch element, means to drive both of the axially shiftable driving clutch elements, and means to move both of said axially shiftable clutch elements harmoniously to disengage one of said clutch elements from driving engagement with the corresponding drum clutch element and to engage the other of said axially shiftable clutch elements with its corresponding drum clutch element, the engaging faces of the teeth of all of said clutch elements being formed as planar engaging surfaces slanting backwardly with respect to the direction of rotation when looking towards the corresponding drum member with respect to planes passing through said teeth and lying parallel to the axes of rotation of the clutch elements.

3. In a car puller the combination of two winding drums, means to journal both of said drums for rotation, a toothed clutch element secured to one end of each drum, a length of cable comprising a cable loop, means to connect one end of said cable loop length to each drum, said clutch element teeth facing in directions for drive of each drum in direction to wind cable on said drum with corresponding unwinding of cable from the other drum, a common driving element for both of said drums, driving toothed clutch elements corresponding to the toothed clutch elements of the drums, means to drive both of said driving toothed clutch elements from a common driving element, means to shift either driving toothed clutch element to driving engagement with the corresponding drum clutch element and to harmoniously disengage the other driving toothed clutch element from the corresponding drum clutch element, to thereby drive either drum selectively with non-drive of the other drum, with corresponding wind of cable on the driven drum and unwind of cable from the non-driven drum, together with drag brake means for each drum, each drag brake means including a brake element in continuous engagement with such drum, and means to increase the force of engagement of each brake element with its drum, wherein said drag brake means includes a cylindrical brake surface in connection with the drum, together with a brake strap engaging said surface over a substantial arc of engagement and a lever arm pivoted to a stationary element for rock of said lever arm, and connections between the ends of said brake strap and said lever arm at different distances from said connections measured from the pivotal point of the lever arm, whereby the drag of the drum on the brake strap tends to draw one end of said strap away from the lever arm and tends to move the other end of the strap towards the lever arm, the first mentioned strap end being connected to the lever arm at a smaller distance from the pivotal point of said lever arm than the second mentioned strap end connection to said lever arm, together with spring yieldable means in the connection of the strap to the lever arm which connection is established to the lever arm at the greater distance from the pivotal point of the lever arm.

FREDERICK H. HOGE.
JOSEPH A. MARLAND.

References Cited in the file of this patent

UNITED STATES PATENTS

| Number | Name | Date |
|---|---|---|
| 1,421,183 | Ditson | June 27, 1922 |
| 1,792,467 | Osgood | Feb. 10, 1931 |
| 1,907,171 | Anderson | May 2, 1933 |
| 2,074,695 | Jimerson | Mar. 23, 1937 |

FOREIGN PATENTS

| Number | Country | Date |
|---|---|---|
| 204,329 | Great Britain | Apr. 17, 1924 |
| 404,797 | Germany | Oct. 30, 1924 |
| 444,390 | Germany | May 20, 1927 |